United States Patent [19]
Deng et al.

[11] Patent Number: 5,876,558
[45] Date of Patent: Mar. 2, 1999

[54] FROTH FLOTATION DEINKING PROCESS FOR PAPER RECYCLING

[75] Inventors: Yulin Deng; Junyong Zhu, both of Marietta, Ga.

[73] Assignee: Institute of Paper Science and Technology, Inc., Atlanta, Ga.

[21] Appl. No.: 992,727

[22] Filed: Dec. 17, 1997

[51] Int. Cl.$^6$ .................................................. D21C 5/02
[52] U.S. Cl. .................................. 162/4; 162/5; 209/164; 209/166
[58] Field of Search ................................ 209/164, 166, 209/167; 162/4, 5

[56] References Cited

U.S. PATENT DOCUMENTS

| | | |
|---|---|---|
| 1,952,727 | 3/1934 | Ralston . |
| 2,005,742 | 6/1935 | Hines . |
| 4,592,834 | 6/1986 | Yang ........................................ 209/166 |
| 4,804,460 | 2/1989 | Moys et al. ............................. 209/164 |
| 4,966,687 | 10/1990 | Trigg . |
| 4,977,943 | 12/1990 | Miyabe . |
| 4,981,582 | 1/1991 | Yoon et al. ............................. 209/164 |
| 4,997,549 | 3/1991 | Atwood .................................. 209/164 |
| 5,039,400 | 8/1991 | Kallioinen . |
| 5,073,253 | 12/1991 | Bishop et al. .......................... 209/164 |
| 5,116,487 | 5/1992 | Parekh . |
| 5,167,798 | 12/1992 | Yoon et al. ............................. 209/170 |
| 5,397,001 | 3/1995 | Yoon et al. ............................. 209/170 |
| 5,511,669 | 4/1996 | Bourke . |
| 5,660,718 | 8/1997 | Chudacek . |

OTHER PUBLICATIONS

Research Proposal No. 4653 Submitted to the U.S. Environmental Protection Agency (EPA) on Jan. 28, 1997, entitled "Wastepaper Deinking by Water Spray Flotation".
L.D. Ferguson, "Deinking Chemistry: Part 1," Tappi Journal, 75–83 (1992).
L.D. Ferguson, "Deinking Chemistry: Part 2," Tappi Journal, 49–58 (1992).
"Recycling Research at IPST", Paper Age (Nov., 1997).
H. Schulze, *Physico–chemical Elementary Processes in Flotation*, pp. 17–25 and 279–283 (Elsevier, New York 1984).
H. Crow, "The Ten Steps of Deinking," pp. 101–106, Jul. 1987 Tappi Journal (1987).

*Primary Examiner*—Thomas M. Lithgow
*Attorney, Agent, or Firm*—Fitch, Even, Tabin & Flannery

[57] ABSTRACT

The present invention provides a froth flotation process for the separation of paper and wood fibers from printed and copying inks and other contaminants during the recycling of paper. A liquid solution containing a frothing agent is applied from the top of a froth flotation device, preferably in the form of a spray, to the upper surface or portion of an aqueous pulp slurry present in the device, or of a froth phase produced in the device, prior to or during the froth flotation process.

29 Claims, 3 Drawing Sheets

FROTH FLOTATION DEINKING PROCESS FOR PAPER RECYCLING

BACKGROUND OF THE INVENTION

1. Field of the Invention

The present invention generally relates to a froth flotation deinking process for use in paper recycling. More particularly, the present invention pertains to a process for the froth flotation separation of paper and wood fibers from ash, fillers, printed inks and other contaminants during wastepaper recycling. A liquid solution containing a frothing agent is mechanically added prior to, or during, the separation process to the upper surface or portion of a wastepaper pulp slurry which has been introduced into a froth flotation deinking device (or to the upper surface or portion of a froth layer produced in the device), rather than being added to, or mixed with, the wastepaper pulp slurry before the slurry is introduced into the froth flotation deinking device.

2. Background and Description of Related Art

The recycling of wastepaper is of growing importance in the protection of the environment by reducing the amount of solid wastepaper and sludge which is placed into landfills. Wastepaper is the largest contributor of the solid waste landfilled each year. In 1988, wastepaper made up about 40% of the municipal solid waste in the United States. About 52 million tons of wastepaper are currently landfilled and, thus, pollute the environment. Further, currently-employed wastepaper recycling processes produce about 0.1 ton of waste dry sludge per 1 ton of dry paper fibers recovered from the recycling process. The untreated sludge contains other environmental pollutants, such as various chemicals, mineral fillers and wood fibers.

Although the paper recycling rate has increased in recent years, the quality of various grades of paper made from recycled wastepaper fibers is much poorer than the quality of similar grades of paper made with virgin (not recycled) paper fibers. Further, the cost of making paper from recycled paper fibers is significantly greater than the cost of making paper from virgin paper fibers.

The objective of paper recycling is to recover paper fibers from wastepaper, such as paper photocopied on a Xerox® or other brand photocopier, which may contain ash, various chemicals, printed or copied inks (offset ink, copying toner particles, etc.) and/or other contaminants.

Froth flotation is an important technique used in the recycling of wastepaper for removing ink and other contaminants from the wastepaper. This technique has been used to effect the separation of various materials from one another, such as a mineral from its ore, for many years.

Froth flotation employs the principles of colloid chemistry, crystallography and physics to separate floatable (hydrophobic) and non-floatable (hydrophilic) particles from each other in an aqueous slurry containing such materials based upon differences in the hydrophobicity of the materials.

Generally, a slurry made from the materials to be separated and water, which has already been thoroughly mixed with flotation reagents (cationic or anionic collectors), conditioning reagents and/or frothing agents (surfactants, frothers or dispersants), is introduced into a froth flotation device, and a pressurized nonreactive gas, such as air, is introduced into the bottom of the device by a generator, and is forced upwards into the slurry in the form of bubbles ranging generally in size from about 50 microns to about 2 or 3 mm in diameter. The air bubbles tend to attach to the floatable particles present in the slurry, and cause those particles to rise upwards to the surface of the slurry as a froth layer. The bubble carrying capacity is largely a function of the surface area of the bubbles per unit volume of the froth. Ideally, only the hydrophobic particles should "float" (adhere to the air bubbles) and rise upwards to the surface of the slurry. However, due to a mechanism known as "entrainment," a considerable amount of hydrophilic particles, such as fibers, and process water (water used to make the pulp slurry), also rise to this surface and become entrained into the froth phase along with the bubbles. To eliminate this entrainment problem and, thereby, improve the separation process, wash water may be introduced into the top of the froth flotation device and distributed onto, or in, the froth layer to scrub entrained non-floatable particles from the froth layer. The wash water descending through the froth flotation device induces entrained non-floatable particles to separate from the froth layer and drop by gravity (sink) through the device. The washed froth layer overflows from the top of the froth flotation device, leaving behind the non-floatable particles. The fraction containing the non-floatable particles is withdrawn from the bottom of the device by gravity or by a pump. However, the foam may be destroyed by the washing water.

In the past, flotation, conditioning and frothing reagents have been added to, and directly mixed with, the pulp slurry prior to the introduction of the slurry into the froth flotation device in order to distribute these reagents on the surface of the particles targeted to be removed by flotation. See, for example, U.S. Pat. Nos. 4,592,834, 4,804,460, 4,981,582, 4,997,549, 5,073,253, 5,116,487, 5,167,798 and 5,397,001, which relate to the froth flotation separation of a mineral from its ore.

Froth flotation deinking (ink removal) processes involve interactions among air bubbles, ink particles and wastepaper and/or wood fibers, and typically have three subprocesses: (a) detachment of the ink particles from the wastepaper or wood fibers; (b) adhesion of the ink particles onto air bubble surfaces; and (c) removal of froth and ink particles from flotation cells. The ink particles, many of which, such as offset ink and copying toner particles, are hydrophobic, attach to the surface of the air bubbles and float upwards with the bubbles towards the upper portion of a froth flotation device during flotation. Under ideal conditions, the hydrophilic paper fibers will not attach to a hydrophobic air bubble surface and, thus, will not float during the flotation process. Thus, fiber loss should not occur. However, fiber loss (and water loss) is a significant problem in many paper recycling mills. A detailed description of the chemistry involved in the froth flotation deinking of wastepaper is provided in L. D. Ferguson, "Deinking Chemistry: part 1," *Tappi J*, 75(7), Page 75 (1992) and L. D. Ferguson, "Deinking Chemistry: Part 2," *Tappi J*, 75(8), Page 49 (1992).

The true flotation (adhesion flotation) and entrapment of wastepaper and wood fibers in froth flotation deinking processes may be determined by measuring fiber removal and water removal by standard methods at different froth heights. The intercept obtained by plotting the fiber removal against water loss obtained at different froth heights represents the true flotation, and the slope of the same curve represents the fiber entrapment by froth network.

Deinking quality and efficiency is often measured by the brightness (or brightness gain) and whiteness, and dirt counts, of handsheets made from the paper fibers deinked during the froth flotation process.

In froth flotation deinking, a chemical surfactant may act as: (a) a dispersant to separate ink particles from the surface of wastepaper or wood fibers and to prevent the redeposition of separated ink particles on the fibers; (b) a collector to agglomerate small particles to large ones, and to change the surface of ink particles which are hydrophilic to hydrophobic; and (c) a frother to generate a layer of foam at the upper portion of the froth flotation device for removal of ink particles and other contaminants. A collector can also cause a surface energy change between solid-liquid, solid-gas, and gas-liquid interfaces. However, a collector is generally not considered to be a surfactant. While it is generally not necessary to use a dispersant or collector for the froth flotation deinking of wastepapers, a frothing agent generally must be used.

Many problems occur during conventional froth flotation processes for the deinking of wastepaper. The addition of a frothing agent directly to the pulp slurry to be introduced into a froth flotation device for separating ink and other contaminants from wastepaper and wood fibers causes several adverse effects.

The paper fibers become contaminated by the adsorption of the frothing agent onto the fibers and, as a result, have a diminished fiber-fiber bonding during papermaking, with the quality of paper being made from these contaminated paper fibers being poor. Moreover, the frothing agent disadvantageously causes foaming to occur on paper-making machines.

Further, the hydrophobicity of the surfaces of the ink particles and, thus, the adhesion of the ink particles to the air bubbles, become reduced if frothing agents are adsorbed onto ink and air bubble surfaces. This results in a decrease in the ink removal efficiency of the process.

Additionally, a high level of paper fiber loss occurs during the froth flotation separation of the ink and other contaminants from the wastepaper and wood fibers. Such loss is caused by the physical entrapment of the fibers in the air bubble network which rises towards the top of the froth flotation device to the froth layer, and by the adhesion of hydrophobic portions of the surfaces of the fibers on the surfaces of the air bubbles present within the device. Fiber losses of from 4 to 24 weight percent have been reported, depending upon the conditions and equipment employed in the froth flotation deinking process. Such fiber loss significantly decreases paper recycling productivity, and significantly increases the costs of paper recycling. It is estimated that a 5% increase in the recovery of paper fibers during a froth flotation deinking process may significantly increase paper recycling productivity, may significantly reduce the costs of paper recycling, and may reduce the dry sludge production in a typical paper recycling mill having a capacity to recycle 250 tons of wastepaper per day by about 2 tons per day (by about 700 tons per year). A 10% increase in the paper recycling rate results in a reduction of 8.8 million tons of wastepaper in landfills each year. The mechanisms of pulp loss during froth flotation deinking are described in Ajersch et al., "Mechanisms of Pulp Loss in Flotation Deinking," *J. Pulp and Paper Sci.* 22, 9:J338–345 (1996).

Water loss also occurs during conventional froth flotation deinking processes as a result of process water (water used to make the pulp slurry) rising upwards to the top surface of the slurry and becoming entrained in the froth layer. Water loss caused by froth entrainment in froth flotation deinking is generally approximately 15 to 30 tons per ton of dry paper. Such water loss also significantly reduces paper recycling productivity, and significantly increases the costs of paper recycling.

It would be advantageous to provide a method for the froth flotation separation of ink and other contaminants from wastepaper and wood fibers which reduces fiber loss, reduces water loss, reduces the amount of frothing agent required to be used during the process (and thereby reduces or completely eliminates the contamination of the paper fibers by frothing agent), and increases the efficiency of the deinking process.

The froth flotation separation processes of the present invention achieve all of the advantages of conventional froth flotation deinking processes. These processes also achieve the additional advantages described in the preceding paragraph, by mechanically applying a liquid solution containing a frothing agent to the upper surface or portion of the pulp slurry introduced into a froth flotation deinking column (or to the upper surface or upper portion of the froth layer produced therein), either prior to, or during, the froth flotation process, preferably by spraying the solution from the top of the froth flotation device onto the upper surface of the pulp suspension (or froth phase) during the froth flotation deinking process, rather than by directly mixing the frothing agent with the pulp slurry prior to introducing the pulp slurry into the froth flotation device.

SUMMARY OF THE INVENTION

The present invention provides a method for the froth flotation separation of fibers of wastepaper and/or wood from ink and/or other contaminants which comprises: (a) introducing an aqueous slurry of wastepaper containing one or more contaminants into a froth flotation device having an upper portion and a lower portion, the slurry having an upper surface and a lower surface, wherein no frothing agent is added to, or mixed with, the slurry prior to introducing the slurry into the froth flotation device; (b) introducing a pressurized nonreactive gas into the lower portion of the device for upward flow through the device; (c) introducing a solution containing a frothing agent to the upper surface, or to an upper portion, of the slurry, whereby a froth layer becomes formed in the upper portion of the device and a fraction which does not contain froth remains in the lower portion of the device, or to an upper surface or portion of a froth layer formed in the device, the frothing agent being introduced in an amount which is effective for forming a froth, and generally not penetrating into the lower portion of the device; (d) withdrawing the froth layer from the upper portion of the device, the froth layer containing the contaminants; and (e) withdrawing the fraction which does not contain froth from the lower portion of the device, the fraction containing the fibers; wherein the solution is introduced to the slurry or froth layer prior to, during and/or after the introduction of the gas into the device, and wherein the process is performed for a period of time which is sufficient to separate at least some of the contaminants from the fibers.

BRIEF DESCRIPTION OF THE DRAWINGS

In FIG. 2, the symbol ■ represents a series of processes of the invention in which a surfactant solution containing 16 mg of surfactant per liter of water was sprayed onto the top of the pulp slurry, the symbol ▲ represents a series of processes of the invention in which a surfactant solution containing 40 mg of surfactant per liter of water was sprayed onto the top of the pulp slurry, and the symbol ● represents a series of conventional froth flotation deinking processes in which a frothing agent was mixed with the pulp suspension at different concentrations prior to being introduced into a froth flotation deinking column.

In FIG. 5, the symbol □ represents a conventional froth flotation deinking process having a surfactant (frother) concentration in the bulk pulp suspension of 2 mg/L based upon the total pulp volume, and the symbol Δ represents a conventional froth flotation deinking process having a surfactant (frother) concentration in the bulk pulp suspension of 20 mg/L based upon the total pulp volume. The other symbols present in FIG. 5 are the same as those described above for FIG. 2. In each of the conventional froth flotation processes, surfactant (frother) was mixed with the pulp suspension prior to introducing the pulp suspension into the froth flotation deinking column.

DETAILED DESCRIPTION OF THE PREFERRED EMBODIMENTS

1. Definitions

Figure 1:
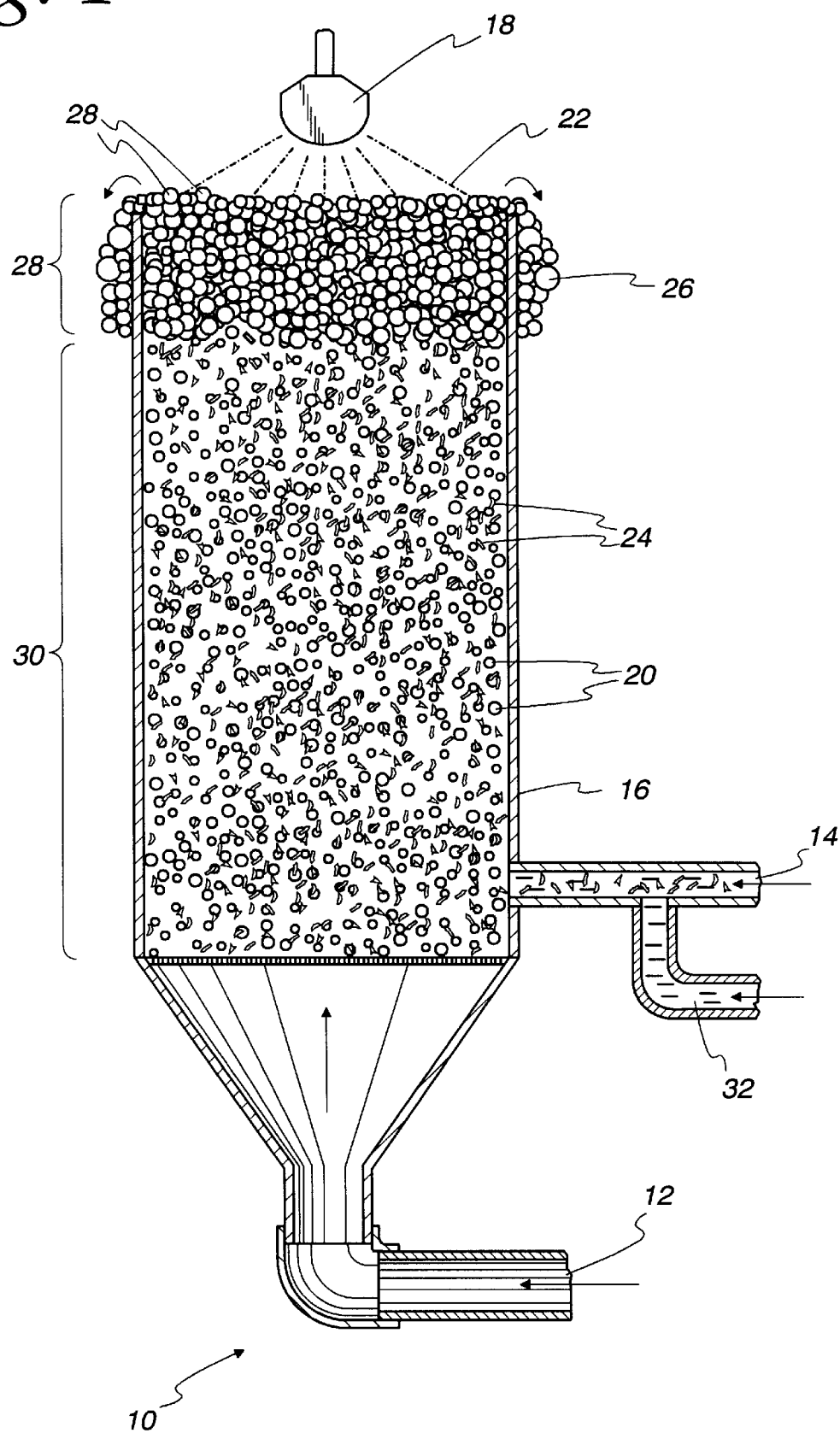
FIG. 1 shows a batch-type flotation deinking cell which has a pressure atomizer at the top thereof for mechanically adding a solution containing a frothing agent to the top surface of a froth phase produced in the cell in a controlled manner.

The term "contaminant" as used herein means ash, various chemicals, such as starch, sizing agents, mineral oils, and the like, and printed or copied inks (offset ink, copying toner particles, etc.), hot melts and like materials.

The phrase "conventional froth flotation processes" as used herein means froth flotation processes wherein a frothing agent is added directly to, or mixed with, a slurry or pulp suspension containing hydrophobic and hydrophilic particles to be separated by a froth flotation process prior to introducing the slurry or pulp suspension into a froth flotation device.

The term "fiber" as used herein means a thread-like body or filament of paper or wood which generally has a length which is many times longer than its diameter. Paper pulps are composed of fibers, usually of wood or vegetable origin, but sometimes of animal or synthetic origin.

The phrase "flotation deinking selectivity" as used herein means the ratio of ink removal efficiency over fiber loss rate.

The term "froth stability" as used herein is an important factor in controlling froth flotation deinking efficiency, and is defined as the froth drainage half-life time in accordance with Pradham et al., "Stability of Aqueous Foams with Polymer Additives," *J. Colloid and Interface Sci.*, 168, Page 333 (1994). The froth stability can be characterized by measuring the decay of froth height as a function of time by the drainage method, or by determining the time variation of the conductivity across the froth by the conductivity method, as described by Weaire et al., "Steady-State Drainage of Aqueous Foam", *Phy. Rev. Lett.* 71(16): 2670 (1993).

The term "paper" as used herein means a sheet made by paper-making processes from fibers, which may contain ink or other contaminants, and includes writing papers, printed papers, newspapers, magazines, papers photocopied on a Xerox® or other brand photocopier, computer printed papers, other types of papers containing various inks, linerboards, corrugating container boards and other mediums, cardboard, mixed office waste papers, tissue grade papers, high grade printed papers, art or painted papers and the like.

The term "pulp" as used herein means a material prepared from shredded (or otherwise sized) paper, wastepaper, wood or other plant or other material, which may be used in the manufacture of paper. For example, it may be made from bond papers copied on a Xerox® or other brand photocopier printed with a fixed pattern of X, as was done in the Example.

The terms "frothing agent" and "frother" as used herein mean any chemical compound or agent which can assist air bubbles in their formation and/or stabilization (which can generate foam or froth). They generally provide air bubbles with sufficient stability and assistance in preventing coalescence of the bubbles. Generally, frothing agents (frothers) reduce surface tension when dissolved in water or water solutions, or reduce interfacial tension between two liquids, or between a liquid and a solid. Frothing agents (frothers) include, for example, detergents (sodium soaps of fatty acids, anionic, cationic or nonionic synthetic detergents, linear alkyl sulfonates and the like), wetting agents (soaps, alcohols, fatty acids and the like), and emulsifiers.

The term "wastepaper" as used herein means paper, as defined above, which has been, or will be, discarded.

Process

The froth flotation separation methods of the present invention, which may be performed in a batch-type or continuous manner, are useful in paper recycling for separating contaminants from wastepaper.

The methods of the present invention may be used to separate a wide variety of wastepaper or wood fibers from a wide variety of ash, printed inks, and other contaminants in a broad range of sizes, preferably from about 0.50 to about 200 μm.

In the process of the present invention, instead of adding or mixing a frothing agent directly with a pulp slurry prepared from wastepaper prior to introducing the pulp slurry into a froth flotation deinking device (and prior to the froth flotation process), a liquid solution containing a frothing agent is mechanically added to the top surface or portion of the wastepaper pulp slurry introduced into a froth flotation deinking device (or to the top surface or portion of the froth layer produced in a froth flotation device) prior to, or during, a froth flotation deinking separation process from above the top surface of the pulp suspension (or froth layer), or from within the top portion of the pulp slurry (or froth layer). No frothing agent is directly added to, or mixed with, the pulp slurry during the preparation of the slurry (i.e., prior to introducing the pulp slurry into the froth flotation device).

It is preferable that the solution containing the frothing agent be applied to the upper surface of the pulp slurry, and in the form of a spray. The frothing agent spray provides a means to control the froth stability by adjusting the flow rate of the spray to deliver the amount of frothing agent as needed at any time during froth flotation. As well as having an effect as a frothing agent, the frothing agent solution has a washing effect on the froth phase produced in the device. When the solution containing frothing agent is applied to the top surface of the pulp slurry or froth phase present in the device in the form of a spray, the momentum of the spray droplets which penetrate into the froth phase modify the fluidynamics within the microchannels of the froth phase and cause the paper or wood fibers entrained in the froth phase to overcome lifting and fluidynamic drag forces and, thereby, flow downwardly out of the froth phase under the forces of gravity to the fraction which does not contain froth.

The results of the experiments described hereinbelow show that the addition of a solution containing frothing agent to the upper surface of the aqueous pulp slurry present in a froth flotation device through a pressure atomizer present at the top of the device during the froth flotation deinking process reduced fiber loss by about 50%, reduced water loss by about 75% and reduced the amount of consumption of the frothing agent by about 95% without a reduction of deinking efficiency when compared with conventional froth flotation deinking processes.

The addition of a frothing agent into a froth flotation device in accordance with the methods of the invention significantly reduces or completely eliminates the contamination of the paper fibers with frothing agent. Most of the frothing agent added to the upper surface, or in the upper portion, of the pulp slurry, or to the upper surface of, or in the upper portion of, the froth phase, adsorbs onto the surface of the froth (foam) produced in the froth flotation device, and does not penetrate into the phase containing the majority of the paper and wood fibers (the non-froth phase contained in the lower portion of the froth flotation device). The hydrophobicity of the surfaces of the ink particles does not become reduced in regions other than the upper portion of the froth flotation device (the portion in which the froth phase is formed). This results in a high affinity of the ink particles for the air bubbles.

When a solution containing a frothing agent is added to the upper surface or portion of the pulp slurry, or to the upper surface or portion of the froth phase, the concentration of the frothing agent present in the froth phase becomes high. The froth phase remains quite stable, even when the dosage of the frothing agent is reduced. Thus, only a small amount of frothing agent is generally required to stabilize the froth. Because frothing agent which is added in accordance with the methods of the invention is utilized more effectively to stabilize the froth, in comparison with conventional froth flotation deinking processes, a smaller quantity of frothing agent is required. This, in turn, increases the efficiency of the deinking process by increasing the hydrophobicity of the ink particles, increases the quality of the paper products produced from the recycled wastepaper fibers (by reducing or eliminating fiber contamination) and reduces the costs of performing froth flotation processes and of recycling wastepaper.

Furthermore, the present invention also provides a convenient method to easily control the froth height during flotation processes even though the pulp source, the operation conditions, and the chemicals used may be varied significantly.

Moreover, by significantly decreasing the loss of paper fibers and process water during the froth flotation deinking process, the methods of the invention significantly increase the recovery of recycled paper fibers and process water during paper recycling and, thereby, increase the productivity of the paper recycling process, reduce the amount of solid wastepaper and/or solid sludge which must be placed into landfills, reduce the costs of paper recycling, and result in the protection of the environment by reducing pollution.

In general, the methods of the present invention may be carried out by the methods described below, or by modifications thereof, using commercially-available reagents and froth flotation and other equipment known by those of skill in the art.

In the methods of the invention, a pulp slurry (thin, watery suspension) of wastepaper and water is made by methods known by those of skill in the art. The slurry will preferably contain about 99.5 weight percent of water, and about 0.5 weight percent of paper and/or wood fibers containing ash, ink particles and/or various other contaminants. In other words, the "consistency" of the pulp slurry will be about 0.5%. However, the amount of water present in the pulp slurry is not critical, and may be varied widely. The pulp slurry may be made by, for example, pulping the paper, and mixing the resulting pulp with water. No frothing agent is added directly to, or mixed with, the pulp slurry prior to introducing the pulp slurry into a froth flotation deinking device.

The pulp slurry is added into a froth flotation device having an upper portion (a portion in which a froth phase will form) and a lower portion (a portion which will contain little or no froth), preferably through an inlet, in a manner known by those of skill in the art. As will be understood by those of skill in the art, the size of the upper and lower portions of the device will vary, depending upon the size of the device used to perform the froth flotation deinking process.

Any froth flotation device, such as a batch- or continuous-type column cell, or a rotating deinking cell, may be used in accordance with the methods of the present invention. An article entitled "Flotation Machines" in *Mining Magazine*, Page 35 (1982), describes several different types of froth flotation devices. A simple glass tube having a 10 cm inner diameter and an 85 cm height, for example, may be employed. The device may have a circular, elliptical, square, rectangular or any other shape or cross section. The length and width of the column are not critical, but the length is preferably greater than the width of the column.

FIG. 1 shows a batch-type froth flotation deinking cell 10 which may be used in accordance with the methods of the invention. This cell 10 has an air inlet 12 which produces air bubbles 20, an inlet for the aqueous slurry of wastepaper fibers (pulp suspension) 14, a column 16 for housing the slurry of wastepaper fibers, and a pressure atomizer 18 which produces a spray of a liquid solution containing a frothing agent 22. If desired, a dispersant and collector may be added to the pulp suspension during the pulping process through an inlet 32 for the dispersant and collector. However, it is generally not necessary to use a dispersant in the processes of the invention. The froth flotation cell 10 separates wastepaper and wood fibers 24 from ink particles and other contaminants 26 by producing a froth phase 28 containing such contaminants in the upper portion of the cell 10 and a fraction containing non-floatable wastepaper and wood fibers 30 in the lower portion of the cell 10. FIG. 1 shows a portion of the froth phase 28 containing ink particles and other contaminants 26 overflowing from the top of the froth flotation cell 10 to the sides thereof. The ink particles and other contaminants 26 have rendered the froth phase 28 dark in color.

A pressurized nonreactive gas, such as air, nitrogen, carbon dioxide, helium or the like, is introduced into the lower portion of the device by an air inlet or other means for upward flow through the pulp slurry in the form of bubbles in a manner known by those of skill in the art. The flow rate of the air or other nonreactive gas being introduced into the froth flotation device will vary, depending upon the capacity of the particular froth flotation column being used, and may readily be determined by a person of skill in the art. For example, for a 6-liter froth flotation column, the flow rate of the nonreactive gas will preferably range from about 10 to about 15 standard liters per minute (slpm). Porous materials, such as screens, nozzles, filters and like devices, with different pore sizes may also be employed to produce bubbles at the lower portion of the froth flotation device.

A solution containing water and a frothing agent is applied mechanically to the upper surface or upper portion of the pulp slurry (or to the upper surface or portion of the froth phase). This will cause a froth layer to form in the upper potion of the device, with the lower portion of the device containing little or no froth. The liquid solution containing the frothing agent may be added to the upper surface of the pulp slurry, to the upper surface of a froth phase produced in the device, to an upper portion of the pulp slurry or to an upper portion of the froth phase produced in the device. Because the heights of different froth flotation devices vary widely, the upper portion of the pulp slurry or froth phase will also vary widely, but may be readily determined by one of ordinary skill in the art. The upper portion of the pulp slurry or froth phase may extend downwardly in the froth flotation device from the upper surface of the pulp slurry or froth phase to a level at which a froth will be formed and paper and wood fibers will be separated from ink and other contaminants during the froth flotation process, preferably with a reduced fiber loss, reduced process water loss, reduced contamination of paper fibers and/or increased level of ink removal efficiency in comparison with conventional froth flotation deinking processes. For example, it may be about the upper 10 meters of pulp slurry or froth phase for one device, or the upper 10 centimeters of pulp slurry or froth phase for another device. However, it is preferable to add the solution containing the frothing agent as high as possible to the pulp slurry or froth phase, for example, to about the upper 50 centimeters of the pulp slurry or froth phase, and more preferably to about the upper 4 centimeters of the pulp slurry or froth phase, and still more preferably to about the upper 1 or 2 centimeters of the pulp slurry or froth phase. It is most preferable to add the solution containing the frothing agent to the top surface of the pulp slurry or froth phase present in the froth flotation deinking device.

The liquid solution containing the frothing agent is preferably fed into the froth flotation device by means of a feed line or other source with a distribution device attached to the line, and positioned above the upper surface of the pulp slurry (or froth phase which may have formed), or in the upper portion of the pulp slurry (or froth phase which may have formed). The distribution device is preferably situated in a manner that the liquid solution containing the frothing agent distributed from the device occurs from above, or from within, the upper surface or portion of the pulp slurry or from above, or within, the upper surface or portion of the froth layer, preferably above the top of the pulp slurry or froth layer.

The distribution device may be any device which can distribute the liquid solution containing the frothing agent to the pulp slurry or froth layer in the manner described above, such as a spray nozzle or head (or a device containing more than one spray nozzle or head), or pressure atomizer, a deflector located near the feed line which deflects the solution being distributed from the feed line radially outward in a spray that passes into the pulp slurry or froth layer, a multi-tier distributor, any of the devices described in U.S. Pat. Nos. 4,592,834, 4,804,460, 4,981,582, 4,997,549, 5,073,253, 5,116,487, 5,167,798 or 5,397,001, or any other such device known by those of skill in the art.

The position of a distribution device used to apply the solution containing the frothing agent to the top of the pulp slurry or froth layer may be widely varied. The position of the distribution device can be easily adjusted by known methods using a traversing mechanism. The range of the positions of the distribution device can be varied, for example, from a position within the upper portion of the pulp slurry or froth phase to a position about 10 meters above the upper surface of the pulp slurry. However, in order to have the solution containing the frothing agent be delivered to the pulp slurry or froth phase in a manner which is as effective as is possible, it is preferable that the distribution device be positioned no more than about 50 centimeters above the pulp slurry or froth phase, with about 2 cm above the pulp slurry or froth phase being more preferable.

The nozzle orifice diameter, gauge pressure and flow rate of the liquid solution containing the frothing agent may also be widely varied. They will vary, depending upon the capacity (height and diameter) of the particular froth flotation column being employed, and the amount of frothing agent which is desired to be applied to the pulp slurry or froth phase. The optimum nozzle orifice diameter, gauge pressure and surfactant flow rate for a particular froth flotation device may readily be determined by a person of skill in the art. For example, the nozzle orifice diameter and the gauge pressure used in the Example were 0.46 mm and 7 psig, which provides a flow rate of 1.42 gallons per second.

Preferably, the distribution device is a spray nozzle (or a device containing multiple spray nozzles) which is centrally disposed at the top of the froth flotation device, and which is adapted to provide multiple streams of liquid solution containing frothing agent that have substantially equal volumes, and are evenly distributed over the cross section of the froth flotation cell. This provides a uniform contact of the liquid solution containing frothing agent with the air bubbles present in the froth layer.

The flow of liquid solution containing frothing agent admitted to the pulp slurry or froth layer from the distribution device will preferably be controlled by a flow control valve positioned in the frothing agent solution line, or other similar device known by those of skill in the art. A conventional flowmeter or rotameter may be used to measure such flow rate by methods known by those of skill in the art.

In the methods of the present invention, unlike with conventional froth flotation processes, no frothing agent is added to, or mixed with, the pulp slurry prior to introducing the pulp suspension into a froth flotation deinking device. Thus, the concentration of the frothing agent in the pulp slurry will be zero.

The amount of frothing agent applied to the pulp suspension or froth layer during the processes of the invention depends upon the concentration of the frothing agent in the liquid solution, the flow rate of the liquid solution containing the frothing agent and the amount of time the liquid solution containing the frothing agent is applied to the pulp suspension (or froth layer which may have formed), each of which may be widely varied to have a desired amount of frothing agent applied. The amount of frothing agent applied during the process may be calculated by multiplying the concentration of the frothing agent in the solution with the flow rate of the solution containing the frothing agent with the amount of time the solution containing the frothing agent is applied to the pulp slurry or froth phase, as was calculated in the Example.

The three variables described in the preceding paragraph may each be widely varied by standard methods to achieve a particular amount of frothing agent applied during the froth flotation deinking process. The concentration of the frothing agent in the solution preferably ranges from about 0.001 to about 500,000 milligrams per liter of water, and more preferably ranges from about 10 to about 100 milligrams per liter of water. The flow rate of the solution containing the frothing agent preferably ranges from about 0.001 gallons per second to about 100 kilogallons per second, with from about 10 to about 100 gallons per second being preferred. The amount of time that the solution containing the frothing agent is applied to the pulp slurry or froth phase preferably ranges from about 10 seconds to about the duration of time that the froth flotation process is being performed, for example, about 10, 15, 20, 25, 30, 35, 40 or 60 minutes, with from about 1 to about 10 minutes being preferred.

The amount of frothing agent to be applied during the froth flotation deinking process of the invention will be, for a froth flotation column of a particular size and geometry, that amount of frothing agent which is effective for causing a froth phase to be formed in the froth flotation device, and for having paper or wood fibers present in a froth flotation device separated from at least some (one or more) ink or other contaminants during the froth flotation process, preferably with a reduced fiber loss, a reduced process water loss, a reduced contamination of paper fibers and/or an increased level of ink removal efficiency in comparison with conventional froth flotation processes. Generally, the more pulp which is present in the froth flotation device, the more frothing agent will be used in conventional froth flotation processes. The amount of frothing agent to be applied during the froth flotation deinking process of the present invention will preferably range from about 0.001 to about 500 g of frothing agent per kg of dry pulp recovered from a froth flotation process, with from about 0.1 to about 5 g/kg being preferred.

The concentration of the frothing agent in the solution to be applied to the upper portion of the pulp slurry or froth phase during the froth flotation deinking process will vary widely, depending upon the size and geometry of the particular froth flotation column employed, and may readily be determined by a person of ordinary skill in the art. Unlike conventional froth flotation processes, in the froth flotation deinking processes of the invention, the consumption of the frothing agent by the paper or wood fibers is independent of the total volume of the pulp slurry, and rather, is dependent upon the cross-sectional area of the froth phase. Thus, for a froth flotation column of a particular size and geometry, the concentration of frothing agent will be that concentration which is effective for achieving the results described above during a particular period of flotation time at a particular flow rate.

The amount of time during which the solution of frothing agent is being applied to the upper portion of the pulp slurry or froth phase may be, but need not be, equal to the amount of time the froth flotation deinking process is being performed. Further, the application of the solution containing the frothing agent to the upper portion of the pulp slurry or froth phase may start before or during the froth flotation process. The solution containing the frothing agent may be added either continuously or intermittently.

The amount of time that the froth flotation process is performed will also vary widely, depending upon the size and geometry of the particular froth flotation column being employed. This amount of time will preferably range from about 10 seconds to about 60 minutes, and will more preferably range from about 5 to about 10 minutes.

The stability of the froth phase produced during a froth flotation deinking process can be controlled by changing the concentration of the solution containing the frothing agent and/or the flow rate of the solution containing the frothing agent and/or the duration of time that the solution containing the frothing agent is applied to the pulp slurry or froth layer, because each of these variables is related to froth stability. Thus, when different types of wastepaper fibers are used during the deinking process, the amount of frothing agent being added to the surface or top portion of the pulp slurry or froth can be easily adjusted by manipulating one or more of these three variables to produce a stable froth. The application of a frothing agent through a frothing agent delivery device from above or in the top portion of the pulp suspension or froth phase provides an easy means for effectively controlling the froth stability during froth flotation, such as when the physiochemical properties of the pulp source vary.

The mean droplet size of solution containing the frothing agent applied as a spray to the upper surface or portion of the pulp slurry or froth layer is not critical, and preferably ranges from about 0.5 to about 5,000 $\mu$m, and more preferably ranges from about 10 to about 1,000 $\mu$m. A laser diffraction instrument (Malvern 2600, Malvern Instruments, Worcester, England) may be employed to measure the droplet size distribution by methods known by those of skill in the art.

Once the froth flotation deinking process has been completed, the froth layer containing the ink particles and other contaminants initially present in the wastepaper may be withdrawn from the upper portion of the froth flotation device by methods known by those of skill in the art and discarded. The remainder of the material present in the lower portion of the device (the non-froth fraction containing paper and wood fibers and water) may be withdrawn from the lower portion of the froth flotation device by methods known by those of skill in the art. For example, the material may be pulled out from the flotation cell, or discharged from the bottom of the cell by opening the bottom part of the cell. In a continuous flotation cell, the material may be discharged from a pulp outlet which is present below the froth layer. The paper and wood fibers may then be processed by standard methods to make recycled paper.

The froth flotation deinking processes of the invention may be performed using any of the wide variety of known frothing agents, such as DowFroth (Dow Chemical Inc.), Tween-20 (Aldrich), polyoxyethylene alkylphenyl ether (J. T. Backer Inc.), polyoxyethylene alkyl ether (Shell Chem.), alkyl phosphate (Aldrich), fatty acids (Aldrich), fatty acid soaps (Aldrich), cetyltrimethylammonium bromide (Aldrich), sodium dodecyl sulfate (Aldrich), block copolymer of ethylene oxide and propylene oxide (Aldrich).

Specific methods within the scope of the invention include, but are not limited to, the methods discussed in the Example presented below.

Contemplated equivalents of the methods described herein include methods which are similar thereto, and which employ the same or similar general principles and/or conditions, wherein one or more simple variations are made which do not adversely affect the success of the methods and materials.

The conditions and pieces of equipment employed in carrying out the individual steps in the methods of the invention described hereinabove are capable of wide variation.

While the various aspects of the present invention are described herein with some particularity, those of skill in the art will recognize numerous modifications and variations which remain within the spirit of the invention. These modifications and variations are within the scope of the invention as described and claimed herein.

EXAMPLE

The following Example describes and illustrates the froth flotation separation methods of the present invention. Those of skill in the art will readily understand that variations of the equipment employed in the procedures described in the Example can be used in the methods of the present invention.

All materials and pieces of equipment employed in the Example, and generally employed to carry out the froth flotation separation methods of the present invention, are commercially available from sources known by those of skill in the art.

EXAMPLE
Froth Flotation Deinking of Photocopied Office Papers

A series of batch-type experiments were performed to compare froth flotation deinking processes within the present invention with conventional froth flotation processes using the surfactant Triton-100 (analyzer grade, J. T. Baker, Inc., Philipsburg, N.J.) as the frothing agent. The data resulting from these experiments are set forth in Tables 1–5 hereinbelow. Some of this data, and additional data obtained by dividing some of the data present in Tables 1–5 with other data present in Tables 1–5, are also shown graphically in FIGS. 2–5.

In these experiments, and as indicated in Tables 1–5, certain conditions, such as the duration of flotation, concentration of surfactant (frother) in the pulp suspension (for conventional froth flotation processes) and concentration of surfactant (frother) in the spray solution (for froth flotation processes of the invention), were varied. In each of the experiments, the same froth flotation cell was used, the volume of the pulp suspension for each batch run performed was 6 liters, and the consistency of the pulp suspension was 0.5% (0.5 weight percent paper or wood fibers containing one or more contaminants and 99.5 weight percent water). For the froth flotation processes of the invention, the duration of the spray application to the pulp suspension was the same as the duration of the froth flotation process.

Comparisons were made between froth flotation processes of the invention and the conventional froth flotation processes with respect to deinking efficiency (measured by brightness or brightness gain of the paper fibers), surfactant consumption, fiber loss and water loss. The water and fiber losses were obtained by a gravimetric method (the subtraction of the weight of the fibers before and after the froth flotation process).

Two froth flotation deinking processes of the invention were performed (one using a surfactant spray solution of deionized water and Triton-100 having a concentration of 16 mg/L, and one using the same surfactant spray solution, but at a concentration of 40 mg/L).

A pressure atomizer was employed in the froth flotation processes of the invention to spray a surfactant solution of water and Triton-100 from the top of the batch-type froth flotation deinking column (Plexiglass tube) shown in FIG. 1 during the froth flotation separation of ink particles from fibers of office papers copied on a Xerox® photocopy machine, rather than by mixing the frothing agent with the slurry of wastepaper fibers prepared before introducing the slurry into the froth flotation deinking device.

A pulp suspension (slurry) containing about 99.5% tap water and about 0.5% pulp was made from bond papers printed with a fixed pattern of X copied on a Xerox® photocopy machine. The papers were pulped by standard methods at a pH of 10 at a consistency of 8% without adding any chemicals except for sodium hydroxide. The ash contents in the original pulp and removed solid were 16 and 8.2%, respectively.

The froth flotation cell used in these experiments is shown in FIG. 1. The inner diameter of the deinking cell was 10.16 cm, and the height of the cell was 86 cm. The height of the pulp slurry prior to the deinking process was 86 cm. The atomizer used to deliver the surfactant solution was a pressure swirl atomizer (Johnstone Supply, Norcross, Ga.) having an orifice diameter of 0.46 mm. The pressure spray atomizer mounted at the top of the deinking column was approximately 2 cm above the pulp suspension surface prior to the deinking process. The atomizer was operated at a gauge pressure of 0.5 atm with a mass flow rate of 1.42 grams/second, which was calibrated with a stopwatch. The mean spray droplet size Sauter mean diameter (SMD) was about 50 $\mu$m measured using standard methods with a laser diffraction instrument (Malvern 2600). The flotation air flow rate was 11–15 slpm. During the experiments, the spray was turned on and off to run conventional froth flotation experiments (without spray containing a frothing agent) and experiments using a spray containing a frothing agent, respectively.

The Triton-100 was added directly into the pulp slurry prior to its introduction into the froth flotation cell for the conventional froth flotation processes performed, but was sprayed as a solution through a nozzle from the top of the froth flotation device during flotation for the processes of the invention. The equilibrium time for surfactant adsorption in the conventional froth flotation processes was about 5 minutes. The surfactant solution was sprayed onto the pulp slurry for the two processes of the invention for an amount of time ranging between 138 and 619 seconds. No dispersant was used in any of the experiments.

The handsheets used for the brightness analysis (to determine deinking efficiency) were made from the deinked paper fibers on a 15-cm Büchner funnel according to the standard TAPPI method (TAPPI Test Method T 272 om-92, "Forming Handsheets for Reflectance Testing of Pulp (Sheet Machine Procedure)," in TAPPI Test Methods, TAPPI Press, Atlanta, Ga., 1996). The brightness and brightness gain of the handsheets was measured using a Shimadzu UV-VIS spectrophotometer (UV-160A) (TAPPI Test Method T452 om-92, "Brightness of Pulp, Paper and Paper Board (Directional Reflectance at 457 nm)," in TAPPI Test Methods, TAPPI Press, Atlanta, Ga. 1996). (Brightness gain (ISO) is the brightness of the wastepaper fibers at the end of the froth flotation process minus the brightness of the original wastepaper pulp.) A higher ISO value means a brighter pulp.

The surfactant diffusion from the froth to the pulp suspension in the flotation column was the concentration change of the surfactant in the column as a function of time and vertical location along the flotation column, and was only conducted in the absence of fibers. The concentration of the surfactant in the column was measured using a Shinazu UV160U spectrophotometer at a wavelength of 223 nm. Deionized water was used as a reference.

Tables 1–5 hereinbelow, and FIGS. 2–5, show the results of these experiments, and demonstrate the advantages of the processes of the invention tested in comparison with the conventional froth flotation deinking process tested.

Froth Establishment with Surfactant Spray

The froth formation in the flotation column under the application of a spray solution containing a frothing agent from the top of the flotation column was first examined in the absence of fibers (water only). No foam layer was established when air bubbles were injected from the bottom of the flotation column that contained only pure water (no frothing agent). However, when a small amount of Triton-100 solution was sprayed from the top of the flotation cell onto the water, a stable foam layer was established on the surface of the pure water phase in less than 0.5 minutes when air bubbles were injected into the water. The rate of foam formation on the top of the pure water was found to depend on the mass flow rate of the spray and surfactant concentration of the spray solution. It usually took a few seconds to generate a froth of constant height.

Surfactant Distribution Between Froth and Pulp Suspension

Measurements of the concentration of the frothing agent distribution within the flotation column containing the above-described pulp slurry as a function of spray time and distance from the froth/pulp suspension interface were then conducted to validate a hypothesis that frothing agent was concentrated in the forth phase, and was not present in the pulp suspension, when the process of the invention was employed. A hypodermic syringe was used to take samples at different times from the flotation column through sampling holes drilled on the column at different locations from the pump/froth interface. The surfactant was found to be mainly concentrated in the froth phase, rather than in the fraction containing the pulp suspension.

The first set of experiments was conducted by taking samples from 20 and 50 cm below the froth/pulp suspension interface at various times from 1 up to 13 minutes during flotation with a spray containing the frothing agent. UV analysis of all of the samples found no absorbance at 223 nm, indicating that the surfactant concentration was essentially zero at these two locations.

A second set of experiments was conducted at the end of a 10-minute froth flotation process, with samples taken at the distances of 1, 10, 30, and 50 cm below the froth/pulp suspension interface. Similar results were obtained from these experiments (no detectable surfactant was found at these locations).

The above results suggest that fiber contamination and surfactant adsorption onto the ink particle surface can be eliminated using the processes of the present invention.

Comparisons of Ink Removal

Because the methods for applying frothing agent in conventional froth flotation deinking processes (mixing of the frothing agent with the pulp suspension prior to introducing the pulp suspension into a froth flotation deinking column) are quite different from the methods for applying frothing agent in accordance with the methods of the present invention (mechanical application of the frothing agent to an upper portion of the pulp suspension or froth layer once the pulp suspension is present in a froth flotation deinking device), the surfactant consumption (mg) divided by the overdry pulp (kg) was used as the basis to compare the performance of the two different types of processes.

For the conventional froth flotation processes, "surfactant (frothing agent) concentration" was the total surfactant (frothing agent) applied divided by the volume of the pulp suspension (6L).

For the processes of the invention, "surfactant (frothing agent) concentration" was the total surfactant (frothing agent) present in the spray frothing agent solution. The amount of surfactant (frother) applied in the spray flotation experiments was calculated from the multiplex product of:

| spray flow rate rate | × | surfactant (frother) concentration in the spray solution | × | the time (duration) of the spray application. |
|---|---|---|---|---|

In these experiments, the time of the conventional froth flotation process was 10 minutes. For the froth flotation processes of the invention, the flotation time and the spray application were the same, and were varied to obtain the desired amount of application of frothing agent, using the different concentrations of the frothing agent in the spray (either 16 mg/L or 40 mg/L).

Figure 2:
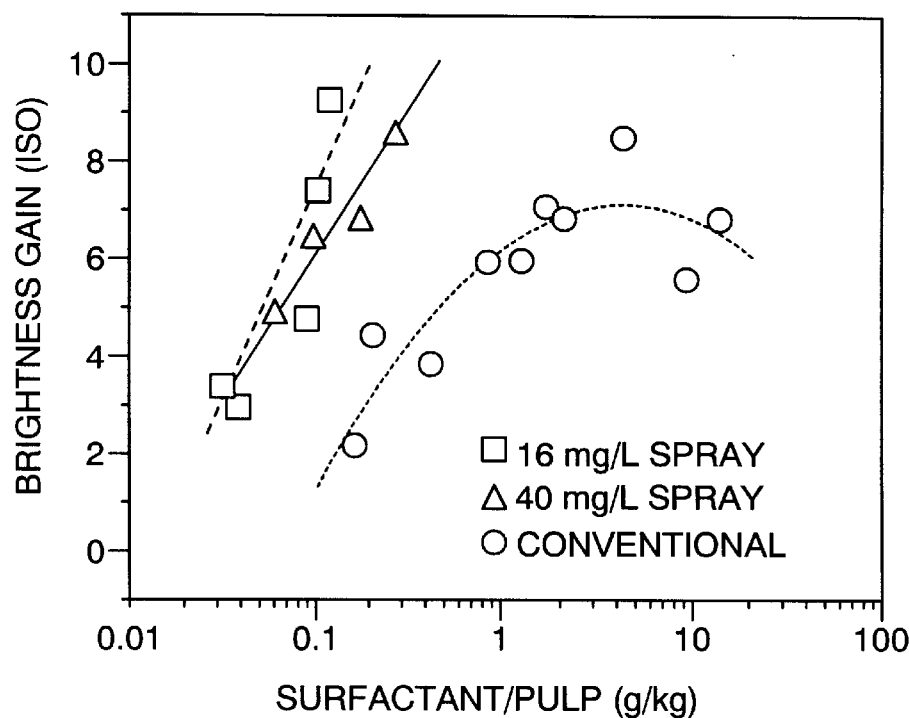
FIG. 2 is a graph which plots surfactant consumption by pulp fibers (g surfactant added per kg of dry pulp initially placed into a froth flotation device) for the froth flotation processes performed in the Example on the horizontal axis (0.01 to 100 g/kg) versus brightness gain in ISO (0 to 10 ISO) on the vertical axis, and compares the correlation of surfactant consumption and deinking efficiency (measured by brightness gain of deinked paper fibers) during the froth flotation processes using the process of the invention at two different surfactant concentrations in the spray and a conventional froth flotation process.

FIG. 2 shows the comparison of the brightness gain of handsheets made from deinked fibers using the two different surfactant spray solutions in accordance with the methods of the invention and the conventional flotation deinking process under the same operation conditions of pulp source, air flow rate and flotation time (10 minutes).

FIG. 2 clearly shows that the surfactant consumption by the pulp (g surfactant per kg of dry pulp) in the two processes of the invention tested was much less than the surfactant consumption for the conventional froth flotation deinking process tested in order to achieve the same level of brightness gain. (Theoretically, the surfactant consumption achieved with the processes of the invention can be further reduced by increasing the ratio of the height to the cross-sectional area of the flotation column, because the surfactant consumption achieved in the processes of the invention is independent of the total volume of the pulp suspension, and is only dependent upon the cross-sectional area of the froth.)

FIG. 2 also shows that, for the conventional froth flotation deinking process tested, the deinking efficiency increased with the increase of surfactant (frother) concentrations up to about 5 g/kg dry pulp, and then decreased rapidly as the surfactant concentration was further increased. There was an optimum surfactant concentration at which ink removal was maximum. While not wishing to be bound to any theories, it is believed that the increase in deinking efficiency exhibited in accordance with the processes of the present invention at low surfactant concentrations is due to an increase in the froth stability, and the decrease in deinking efficiency exhibited for the conventional froth flotation deinking process at high surfactant concentrations is because of a decrease in the hydrophobicity of the surfaces of the ink particles caused by the adsorption of surfactant thereon. Because there is an optimum surfactant concentration for conventional froth flotation deinking processes, it is often difficult to control the surfactant concentrations in industrial applications. The optimum surfactant concentration often changes with fiber sources. In contrast, and as shown by the data present in FIG. 2, it is not necessary to find an optimum surfactant concentration when performing the froth flotation deinking methods of the invention. In contrast to the conventional froth flotation process, the data show that ink removal increased with the increase of surfactant application for the amount applied in the surfactant spray flotation. Moreover, the application of frother can be constantly adjusted with the spray flotation, making it more suitable for feedback process control in industrial applications.

In FIG. 2, the x coordinate is Column B divided by Column G in Tables 1–3, and the y coordinate is Column D in Tables 1–3 (Table 1 for the symbol ●, Table 2 for the symbol ■ and Table 3 for the symbol ▲).

Comparisons of Fiber and Water Losses

Figure 3:
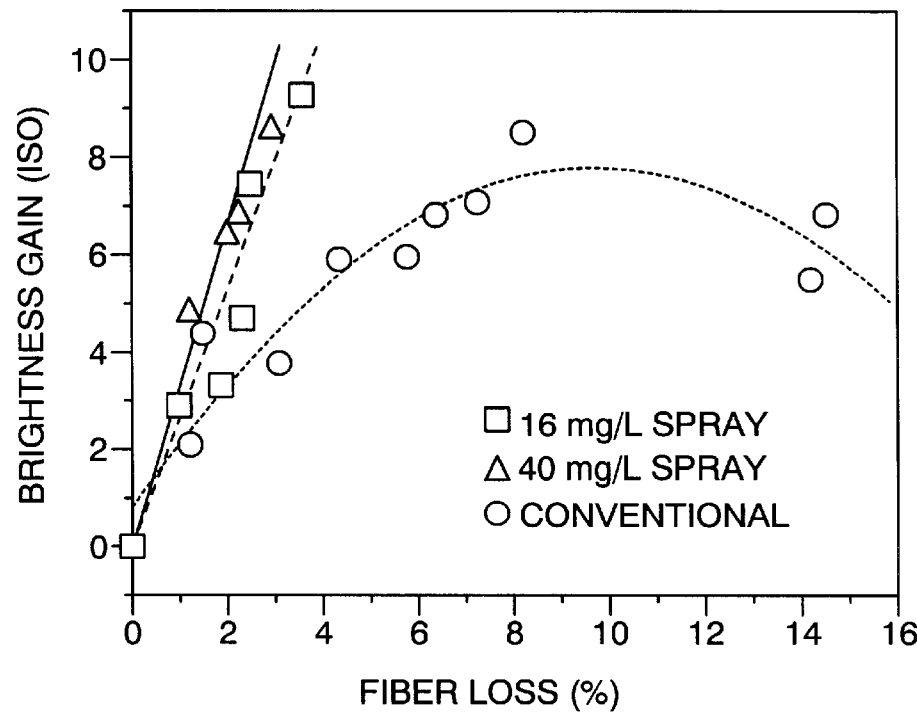
FIG. 3 is a graph comparing the correlation of percent fiber loss and deinking efficiency (measured by brightness gain of deinked paper fibers) between the same froth flotation deinking processes described above for FIG. 2. The graph plots percent fiber loss (from 0 to 16%) on the horizontal axis (based upon the total dry fiber content initially placed into the pulp slurry) versus brightness gain in ISO (from 0 to 10 ISO) on the vertical axis. The symbols present in FIG. 3 are the same as those described above for FIG. 2.

FIG. 3 compares the correlation between percent fiber loss and deinking efficiency (measured by brightness gain) between the two different concentrations of surfactant spray solution (16 mg/L and 40 mg/L) in accordance with the methods of the invention and the conventional froth flotation deinking process under the same conditions described for FIG. 2. The results show that fiber loss was reduced by about 50% when surfactant was sprayed from the top of the flotation column in comparison with the conventional flotation process at the maximum ink removal conditions. This shows the success of the processes of the invention in reducing fiber loss without reducing deinking efficiency. In FIG. 3, the x coordinate is Column E divided by Column G in Tables 1–3, and the y coordinate is Column D in Tables 1–3.

Figure 4:
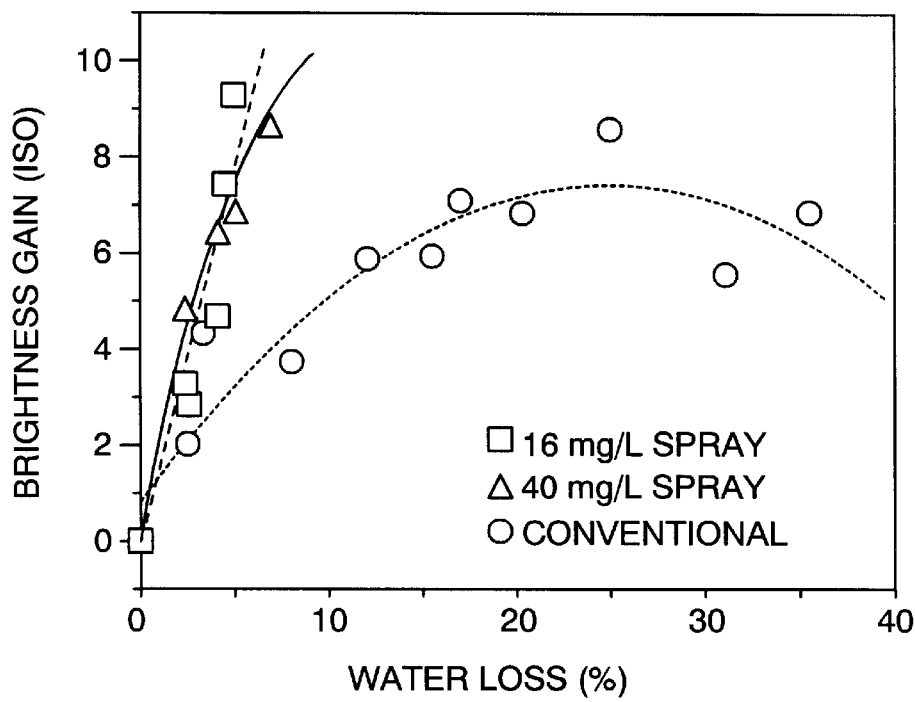
FIG. 4 is a graph comparing the correlation of percent water loss and deinking efficiency (measured by brightness gain of deinked paper fibers) between the same froth flotation deinking processes described above for FIG. 2. The graph plots percent water loss of the total water initially present in the pulp slurry (from 0 to 40%) on the horizontal axis versus brightness gain in ISO (from 0 to 10 ISO) on the vertical axis. The symbols present in FIG. 4 are the same as those described above for FIG. 2.

FIG. 4 compares the correlation between percent water loss and deinking efficiency (measured by brightness gain) between the two different concentrations of surfactant spray solution (16 mg/L and 40 mg/L) in accordance with the methods of the invention and the conventional froth flotation deinking process under the same conditions described for FIG. 2. The results show that water loss was reduced by about 75% when surfactant was sprayed from the top of the flotation column in comparison with the conventional froth flotation process at the maximum ink removal conditions. This shows the success of the processes of the invention in reducing water loss without reducing the deinking efficiency. In FIG. 4, the x coordinate is Column F divided by Column I of Tables 1–3, and the y coordinate is Column D of Tables 1–3.

Comparison of Ink Removal Rates

Figure 5:
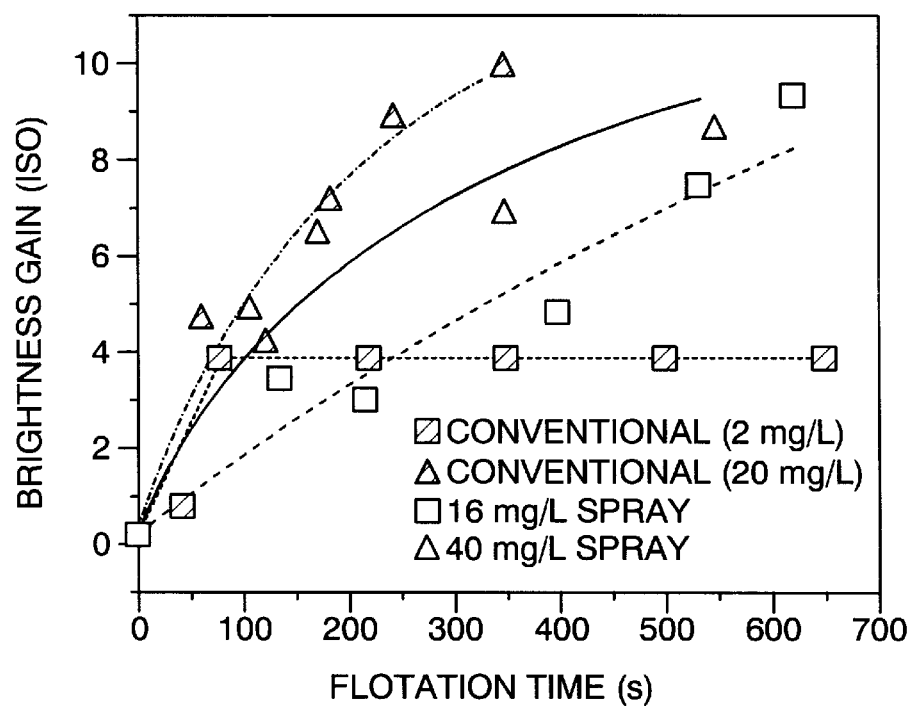
FIG. 5 is a graph comparing the time-dependant deinking characteristics (rate of ink removal) between the two processes of the invention described for FIGS. 2–4 (surfactant concentration in the spray of 16 mg/L or 40 mg/L) and two conventional froth flotation deinking processes (having surfactant concentration in the pulp suspension of 2 mg/L or 20 mg/L). The graph plots flotation time in seconds (from 0 to 700 seconds) on the horizontal axis versus brightness gain in ISO (from 0 to 10 ISO) on the vertical axis for the froth flotation processes described in the Example.

FIG. 5 compares brightness gain over time between the two different concentrations of surfactant spray solution (16 mg/L and 40 mg/L) in accordance with the methods of the invention and conventional froth flotation deinking processes using different concentrations of the frothing agent in the pulp suspension (2 mg of Triton-100 per liter of pulp slurry and 20 mg of Triton-100 per liter of pulp slurry). FIG. 5 shows that ink removal increases with flotation time for all of the four experiments conducted initially. However, for the conventional flotation conducted at a surfactant concentration of 2 mg/L, ink removal efficiency reached a constant value after 80 seconds. This was a result of there not being enough surfactant in the system after 80 seconds to form a stable foam. The results in FIG. 5 also show that the 10 minutes of flotation were sufficient to achieve the desired brightness for the pulp employed in these experiments using the processes of the invention, and that the ink removal rate using the processes of the invention was compatible with that of the conventional flotation processes, even though the surfactant consumption was reduced by more than 95%. In FIG. 5, the x coordinate is Column A in Tables 2–5, and the y coordinate is Column D in Tables 2–5.

TABLE 1

Experiments Using Conventional Froth Flotation Process (Different Surfactant Concentrations) (FIGS. 2–4)

Column Name

| Conventional (No Spray) (Symbol ● in FIGS. 2–4) Experiment # | A Duration of Flotation (Seconds) (s) | B Mass of Surfactant (g) | C Concentration of Surfactant in Bulk Pulp Suspension (mg/L) | D Brightness Gain (average of the two single-side measurements of each handsheet) (ISO) | E Fiber Loss (g) | F Water Loss (ml) | G Weight of Pulp in a Batch (O.D.) (g) | H Consistency of Pulp Suspension (%) | I Volume of Water in Flotation Cell (ml) |
|---|---|---|---|---|---|---|---|---|---|
| 1 | 633 | 0.0048 | 0.8 | 2.05 | 0.38 | 153.94 | 30 | 0.5 | 6000 |
| 2 | 633 | 0.006 | 1 | 4.36 | 0.46 | 202.56 | 30 | 0.5 | 6000 |
| 3 | 633 | 0.012 | 2 | 3.74 | 0.94 | 486.14 | 30 | 0.5 | 6000 |
| 4 | 633 | 0.024 | 4 | 5.86 | 1.32 | 729.21 | 30 | 0.5 | 6000 |
| 5 | 633 | 0.036 | 6 | 5.89 | 1.75 | 931.76 | 30 | 0.5 | 6000 |
| 6 | 633 | 0.048 | 8 | 7.03 | 2.2 | 1020.89 | 30 | 0.5 | 6000 |
| 7 | 633 | 0.06 | 10 | 6.77 | 1.93 | 1215.35 | 30 | 0.5 | 6000 |
| 8 | 633 | 0.12 | 20 | 8.49 | 2.48 | 1499.09 | 30 | 0.5 | 6000 |
| 9 | 633 | 0.24 | 40 | 5.5 | 4.28 | 1863.74 | 30 | 0.5 | 6000 |
| 10 | 633 | 0.36 | 60 | 6.78 | 4.38 | 2123.04 | 30 | 0.5 | 6000 |

TABLE 2

Experiments Using Process of Invention (16 mg/L Concentration Spray), (FIGS. 2–5)

Column Name

| Spray 1 (Symbol ■ in FIGS. 2–5) Experiment # | A Duration of Spray Application and Flotation (Seconds) (s) | B Mass of Surfactant (g) | C Concentration of Surfactant in Spray Solution (mg/L) | D Brightness Gain (average of the two single-side measurements of each handsheet) (ISO) | E Fiber Loss (g) | F Water Loss (ml) | G Weight of Pulp in a Batch (O.D.) (g) | H Consistency of Pulp Suspension (%) | I Volume of Water in Flotation Cell (ml) |
|---|---|---|---|---|---|---|---|---|---|
| 1 | 138.03 | 0.00232 | 16 | 3.29 | 0.57 | 145 | 30 | 0.5 | 6000 |
| 2 | 217.37 | 0.00253 | 16 | 2.86 | 0.31 | 158 | 30 | 0.5 | 6000 |
| 3 | 398.78 | 0.00397 | 16 | 4.70 | 0.7 | 248 | 30 | 0.5 | 6000 |
| 4 | 531.5 | 0.00432 | 16 | 7.41 | 0.75 | 270 | 30 | 0.5 | 6000 |
| 5 | 619.06 | 0.00477 | 16 | 9.27 | 1.07 | 298 | 30 | 0.5 | 6000 |

TABLE 3

Experiments Using Process of Invention (40 mg/L Concentration Spray), (FIGS. 2–5)

Column Name

| Spray 2 (Symbol ▲ in FIGS. 2–5) Experiment # | A Duration of Spray Application and Flotation (Seconds) (s) | B Mass of Surfactant (g) | C Concentration of Surfactant in Spray Solution (mg/L) | D Brightness Gain (average of the two single-side measurements of each handsheet) (ISO) | E Fiber Loss (g) | F Water Loss (ml) | G Weight of Pulp in a Batch (O.D.) (g) | H Consistency of Pulp Suspension (%) | I Volume of Water in Flotation Cell (ml) |
|---|---|---|---|---|---|---|---|---|---|
| 1 | 107.65 | 0.00408 | 40 | 4.78 | 0.37 | 142.51 | 30 | 0.5 | 6000 |
| 2 | 172.09 | 0.0051 | 40 | 6.37 | 0.61 | 248.55 | 30 | 0.5 | 6000 |
| 3 | 347.94 | 0.00736 | 40 | 6.78 | 0.67 | 305.5 | 30 | 0.5 | 6000 |
| 4 | 546.77 | 0.01 | 40 | 8.54 | 0.88 | 413.06 | 30 | 0.5 | 6000 |

TABLE 4

Experiments Using Conventional Froth Flotation Process (2 mg/L Concentration) (FIG. 5)

Column Name

| Conventional (No-Spray) (Symbol □ in FIG. 5) Experiment # | A Duration of Flotation (Seconds) (s) | B Mass of Surfactant (g) | C Concentration of Surfactant in Bulk Pulp Suspension (mg/L) | D Brightness Gain (average of the two single-side measurements of each handsheet) (ISO) | E Fiber Loss (g) | F Water Loss (ml) | G Weight of Pulp in a Batch (O.D.) (g) | H Consistency of Pulp Suspension (%) | I Volume of Water in Flotation Cell (ml) |
|---|---|---|---|---|---|---|---|---|---|
| 0 | 0 | 0 | 2 | 0 | 0 | 0 | 30 | 0.5 | 6000 |
| 1 | 45 | 0.012 | 2 | 0.63 | 0.88 | 324.09 | 30 | 0.5 | 6000 |
| 2 | 80 | 0.012 | 2 | 3.74 | 0.94 | 486.14 | 30 | 0.5 | 6000 |
| 3 | 220 | 0.012 | 2 | 3.74 | 0.94 | 486.14 | 30 | 0.5 | 6000 |
| 4 | 370 | 0.012 | 2 | 3.74 | 0.94 | 486.14 | 30 | 0.5 | 6000 |
| 5 | 520 | 0.012 | 2 | 3.74 | 0.94 | 486.14 | 30 | 0.5 | 6000 |
| 6 | 670 | 0.012 | 2 | 3.74 | 0.94 | 486.14 | 30 | 0.5 | 6000 |

TABLE 5

Experiments Using Conventional Froth Flotation Process (20 mg/L Concentration) (FIG. 5)

Column Name

| Conventional (No-Spray) (Symbol Δ in FIG. 5) Experiment # | A Duration of Flotation (Seconds) (s) | B Weight of Surfactant (g) | C Concentration of Surfactant in Bulk Pulp Suspension (mg/L) | D Brightness Gain (average of the two single-side measurements of each handsheet) (ISO) | E Fiber Loss (g) | F Water Loss (ml) | G Weight of Pulp in a Batch (O.D.) (g) | H Consistency of Pulp Suspension (%) | I Volume of Water in Flotation Cell (ml) |
|---|---|---|---|---|---|---|---|---|---|
| 0 | 0 | 0 | 20 | 0 | 0 | 0 | 30 | 0.5 | 6000 |
| 1 | 61.95 | 0.12 | 20 | 4.58 | 1.39 | 704.9 | 30 | 0.5 | 6000 |
| 2 | 123.03 | 0.12 | 20 | 4.05 | 1.51 | 1053.3 | 30 | 0.5 | 6000 |
| 3 | 183.83 | 0.12 | 20 | 7.06 | 1.98 | 1255.86 | 30 | 0.5 | 6000 |
| 4 | 243.18 | 0.12 | 20 | 8.80 | 2.4 | 1548.41 | 30 | 0.5 | 6000 |
| 5 | 346.47 | 0.12 | 20 | 9.87 | 2.51 | 1539.44 | 30 | 0.5 | 6000 |

The foregoing Example is provided to enable one of ordinary skill in the art to practice the present invention. This example is merely illustrative, however, and should not be read a limiting the scope of the invention as it is claimed in the appended claims.

While the present invention has been described herein with some specificity, and with reference to certain preferred embodiments thereof, those of ordinary skill in the art will recognize numerous variations, modifications and substitutions of that which has been described which can be made, and which are within the scope and spirit of the invention. It is intended that all of these modifications and variations be within the scope of the present invention as described and claimed herein, and that the invention be limited only by the scope of the claims which follow, and that such claims be interpreted as broadly as is reasonable.

All patents and publications referred to throughout the specification are hereby incorporated herein by reference in their entireties, without admission that such patents and publications are prior art.

What is claimed is:

1. A method for the froth flotation separation of fibers of wastepaper or wood fibers from ink or other contaminants, said method comprising:

(a) introducing an aqueous slurry of wastepaper containing one or more contaminants into a froth flotation device having an upper portion and a lower portion, said slurry having an upper surface and a lower surface, wherein no frothing agent is added to said slurry prior to introducing said slurry into said froth flotation device;

(b) introducing a pressurized nonreactive gas into said lower portion of said device for upward flow through said device;

(c) introducing a solution containing a frothing agent to said upper surface of said slurry, or to an upper portion of said slurry, whereby a froth layer becomes formed in said upper portion of said device and a fraction which does not contain froth remains in said lower portion of said device, or introducing a solution containing a frothing agent to an upper surface or portion of a froth layer formed in said device, said frothing agent being introduced in an amount which is effective for forming a froth; and (d) withdrawing said fraction which does not contain froth from said device, said fraction containing said fibers;

wherein said solution is introduced to said slurry or froth layer prior to, during or after the introduction of said gas into said device, and wherein said process is performed for a period of time which is sufficient to separate at least some of said contaminants from said fibers.

2. The method of claim 1, wherein said solution is introduced to said slurry or froth layer prior to the introduction of said gas into said device.

3. The method of claim 1, wherein said solution is introduced to said slurry or froth layer during the introduction of said gas into said device.

4. The method of claim 2, wherein said solution is applied to about the upper 50 cm of said slurry or froth layer.

5. The method of claim 3, wherein said solution is applied to about the upper 50 cm of said slurry or froth layer.

6. The method of claim 4, wherein said solution is applied to about the upper 4 cm of said slurry or froth layer.

7. The method of claim 5, wherein said solution is applied to about the upper 4 cm of said slurry or froth layer.

8. The method of claim 6, wherein said solution is applied to about the upper 2 cm of said slurry or froth layer.

9. The method of claim 7, wherein said solution is applied to about the upper 2 cm of said slurry or froth layer.

10. The method of claim 8, wherein said solution is applied to the upper surface of said slurry or froth layer.

11. The method of claim 9, wherein said solution is applied to the upper surface of said slurry or froth layer.

12. The method of claim 1, wherein said solution is introduced as a spray above the upper surface of said slurry.

13. The method of claim 6, wherein said solution is introduced as a spray above the upper surface of said slurry.

14. The method of claim 7, wherein said solution is introduced as a spray above the upper surface of said slurry.

15. The method of claim 12, wherein said spray is formed by a pressure atomizer positioned no higher than about 50 cm above said upper surface of said slurry.

16. The method of claim 13, wherein said spray is formed by a pressure atomizer positioned no higher than about 50 cm above said upper surface of said slurry.

17. The method of claim 14, wherein said spray is formed by a pressure atomizer positioned no higher than about 50 cm above said upper surface of said slurry.

18. The method of claim 15, wherein said pressure atomizer is positioned no higher than about 4 cm above said upper surface of said slurry.

19. The method of claim 16, wherein said pressure atomizer is positioned no higher than about 4 cm above said upper surface of said slurry.

20. The method of claim 17, wherein said pressure atomizer is positioned no higher than about 4 cm above said upper surface of said slurry.

21. The method of claim 12, wherein said solution contains from about 0.001 to about 500,000 mg of frothing agent per liter of water, wherein said solution is introduced at a spray flow rate ranging from about 0.001 gallons per second to about 100 kilogallons per second for a period of time ranging from about 10 seconds to about 60 minutes, wherein the amount of frothing agent delivered ranges from about 0.001 to about 500 g per kg of dry pulp recovered from said method, and wherein said method is performed for a period of time ranging from about 10 seconds to about 60 minutes.

22. The method of claim 13, wherein said solution contains from about 0.001 to about 500,000 mg of frothing agent per liter of water, wherein said solution is introduced at a spray flow rate ranging from about 0.001 gallons per second to about 100 kilogallons per second for a period of time ranging from about 10 seconds to about 60 minutes, wherein the amount of frothing agent delivered ranges from about 0.001 to about 500 g per kg of dry pulp recovered from said method, and wherein said method is performed for a period of time ranging from about 10 seconds to about 60 minutes.

23. The method of claim 14, wherein said solution contains from about 0.001 to about 500,000 mg of frothing agent per liter of water, wherein said solution is introduced at a spray flow rate ranging from about 0.001 gallons per second to about 100 kilogallons per second for a period of time ranging from about 10 seconds to about 60 minutes, wherein the amount of frothing agent delivered ranges from about 0.001 to about 500 g per kg of dry pulp recovered from said method, and wherein said method is performed for a period of time ranging from about 10 seconds to about 60 minutes.

24. The method of claim 21, wherein said solution contains from about 10 to about 100 mg of frothing agent per liter of water, wherein said solution is introduced at a spray flow rate ranging from about 1 to about 100 gallons per second for a period of time ranging from about 1 to about 10 minutes, wherein the amount of frothing agent delivered ranges from about 0.1 to about 5 g per kg of dry pulp recovered from said method, and wherein said method is performed for a period of time ranging from about 5 to about 10 minutes.

25. The method of claim 22, wherein said solution contains from about 10 to about 100 mg of frothing agent per liter of water, wherein said solution is introduced at a spray flow rate ranging from about 1 to about 100 gallons per second for a period of time ranging from about 1 to about 10 minutes, wherein the amount of frothing agent delivered ranges from about 0.1 to about 5 g per kg of dry pulp recovered from said method, and wherein said method is performed for a period of time ranging from about 5 to about 10 minutes.

26. The method of claim 23, wherein said solution contains from about 10 to about 100 mg of frothing agent per liter of water, wherein said solution is introduced at a spray flow rate ranging from about 1 to about 100 gallons per second for a period of time ranging from about 1 to about 10 minutes, wherein the amount of frothing agent delivered ranges from about 0.1 to about 5 g per kg of dry pulp recovered from said method, and wherein said method is performed for a period of time ranging from about 5 to about 10 minutes.

27. The method of claim 24, wherein said solution contains from about 16 to about 40 mg of frothing agent per liter of water, wherein said solution is introduced at a spray flow rate of about 1.4 gallons per second for a period of time ranging from about 107 to about 600 seconds, wherein the amount of frothing agent delivered ranges from about 0.1 to about 0.5 g per kg of dry pulp recovered from said method, and wherein said method is performed for about 10 minutes.

28. The method of claim 25, wherein said solution contains from about 16 to about 40 mg of frothing agent per liter of water, wherein said solution is introduced at a spray flow rate of about 1.4 gallons per second for a period of time ranging from about 107 to about 600 seconds, wherein the amount of frothing agent delivered ranges from about 0.1 to about 0.5 g per kg of dry pulp recovered from said method, and wherein said method is performed for about 10 minutes.

29. The method of claim 26, wherein said solution contains from about 16 to about 40 mg of frothing agent per liter of water, wherein said solution is introduced at a spray flow rate of about 1.4 gallons per second for a period of time ranging from about 107 to about 600 seconds, wherein the amount of frothing agent delivered ranges from about 0.1 to about 0.5 g per kg of dry pulp recovered from said method, and wherein said method is performed for about 10 minutes.

* * * * *